United States Patent [19]

Hood et al.

[11] E Re. 31,505

[45] Reissued Jan. 24, 1984

[54] COIL DEPLETION SENSOR

[75] Inventors: Walter J. Hood, Shaker Heights; George Gulden, Jr., Lyndhurst, both of Ohio

[73] Assignee: Kent Corporation, Cleveland, Ohio

[21] Appl. No.: 398,931

[22] Filed: Jul. 16, 1982

Related U.S. Patent Documents

Reissue of:

[64] Patent No.: 4,163,527
Issued: Aug. 7, 1979
Appl. No.: 932,272
Filed: Aug. 9, 1978

[51] Int. Cl.[3] ..... B65H 17/48; B21C 47/16

[52] U.S. Cl. ..... 242/55; 242/55.19 R; 242/78.6

[58] Field of Search ..... 242/55, 55.19 R, 55.19 A, 242/78.1, 78.6, 78.7; 226/118, 119

[56] References Cited

U.S. PATENT DOCUMENTS

| | | | |
|---|---|---|---|
| 3,258,212 | 6/1966 | La Tour | 242/78.1 X |
| 3,600,562 | 8/1971 | Di Nicolantonio | 242/78.6 X |
| 3,610,546 | 10/1971 | McGorry | 242/78.6 X |
| 3,888,430 | 6/1975 | Costello | 242/78.6 X |

*Primary Examiner*—Stuart S. Levy

*Assistant Examiner*—Lloyd Dolgan

*Attorney, Agent, or Firm*—Hamilton, Renner & Kenner

[57] ABSTRACT

A control device for a continuous processing line which is fed material from a coil utilizes information regarding the outside diameter of the material on a coil having a constant inside diameter as a basis for its control functions. A typical application is in the control of a strip accumulator (15) in a strip processing line wherein strip(s) on a revolvable coil is drawn from an uncoiler (10) by the revolvable pinch rolls (16) of the accumulator at which point a certain quantity of material is stored so that when the end of a coil is reached a new coil may be attached to the old coil without stopping the line. In such instances it is highly desirable that the accumulator be substantially filled so that a maximum time is available to attach the new coil. The control device includes means (31) providing a signal proportional to the revolutions of the pinch rolls and means (30) providing a signal proportional to the revolutions of the supply coil. The pinch roll revolutions are counted by a counter (38) and if the counter receives the signal proportional to the revolution of the supply coil [before] *after* counting a predetermined number of pinch roll revolutions, it is reset to count again until such time that the counter [reaches] *does not reach* the predetermined number of counts before receiving a supply coil revolution signal at which time accumulator control is initiated.

14 Claims, 2 Drawing Figures

COIL DEPLETION SENSOR

Matter enclosed in heavy brackets [ ] appears in the original patent but forms no part of this reissue specification; matter printed in italics indicates the additions made by reissue.

TECHNICAL FIELD

This invention relates to a method and apparatus for electronically controlling a processing line which utilizes at its input a coil of strip or other material having a diameter which is used as a basis for the control operations. More particularly, this invention relates to a method and apparatus for controlling an accumulator in a strip processing line to assure that the accumulator is substantially filled when the end of a coil of strip material is reached so as to afford a maximum amount of time to affix a new coil of strip to the end of the depleted coil without interruption of the processing line.

BACKGROUND ART

Many industrial processing lines utilize an input material which is fed thereto from a coil. As the coil is depleted, its outer diameter changes and therefore the instantaneous diameter of the coil of material may be used to control functions of the processing line. Typical of such operations are those which utilize a strip material, such as a metallic strip material, as an input and require that the strip be continually fed thereto. This strip is available from a coil which is payed out until depleted. Because it would be highly undesirable to stop the processing line upon each depletion of a coil, variously configured strip accumulators have been developed which receive strip from the input coil and hold or store a certain amount thereof while at the same time paying out strip so held to the processing line. Such accumulators are thus intended to permit the processing line to remain active during the time a new input strip coil is attached, as by welding, to the end of the coil which has just been depleted. A typical accumulator which is very popular is shown in the U.S. Pat. No. 3,506,210.

So that there is maximum amount of time for the new coil to be attached to the old coil, it is important that the accumulator be controlled so that it is filled substantially to its capacity at the time a coil is depleted. At first no such control was available with only a sensing device being provided to detect the end of a coil of strip before it reached the accumulator so that the feed to the accumulator could be stopped for the welding process. Such a sensing device is disclosed in said U.S. Pat. No. 3,506,210 but did not, of course, provide any guarantee that the accumulator would be full at the time of welding.

A significant advancement in accumulator control is found in U.S. Pat. No. 3,888,430. There a pivoting arm rested on the coil and contacted a series of limit switches as the coil became depleted to control the accumulator. While this mechanical device has met with commercial success, from a practical standpoint it is not without its problems. First, some materials are not suited for the physical contact of an arm because they are easily scratched. Such scratching of any material was often prevalent when a coil was out-of-round, as is often the case. In this situation the arm would tend to bounce not only damaging the material but inducing false tripping of the limit switches. At high speeds with out-of-round coils, the arm would tend to stay out of contact with the coil inducing further false limit switch actuation. Additional false alarms and/or damage to the arm often occurred due to potential interference between the arm and the strip edge guides on the uncoiler. Such could be particularly prevalent with strip of narrow width where the edge guides would be closer to the arm.

In addition, this mechanical device was not conveniently and accurately settable. Every time a different gauge strip was utilized the limit switches had to be repositioned. Such was not only a time-consuming procedure but it also lacked in precision in that a misplacement of a few thousandths of an inch could result in a significant difference in strip material, particularly, that of thin gauge. Of course, the mechanical placement of a limit switch to thousandths of an inch accuracy is highly unlikely.

Finally, the use of the mechanical pivoting arm often took away valuable physical space in the processing line with some lines not having the room for the placement of the arm. In those areas where there was room for such devices, the arms could be damaged by a careless malpositioning of the arm on the coil or other activities in the area. Thus, while the device of U.S. Pat. No. 3,888,430 represented an important step in accumulator control, its effectiveness, accuracy and efficient use was somewhat limited.

DISCLOSURE OF INVENTION

It is therefore a primary object of the present invention to provide a method and apparatus to control a manufacturing line, which utilizes a coil of material as an input, based on the instantaneous diameter of the input coil.

It is another object of the present invention to provide a method and apparatus, as above, which electronically controls a strip accumulator to assure that it is filled to capacity when a new input coil of strip material is attached to the strip already in the accumulator.

It is a further object of the present invention to provide a method and apparatus to control a strip accumulator, as above, which is extremely accurate and easy to set in the event of a change in thickness of the input strip material.

It is yet another object of the present invention to control a strip accumulator, as above, which requires no additional floor space in the processing line and which will not damage the input strip material.

It is an additional object of the present invention to provide a method and apparatus to control a strip accumulator, as above, which will not generate any false control signals even if the input coil of material is out-of-round.

These and other objects of the present invention which will become apparent from the description to follow are accomplished by the improvement hereinafter described and claimed.

In general, the invention relates to a control for a processing line which utilizes an input material that is drawn from a first revolving member having a diminishing diameter past a second revolving member of constant diameter. The movement of the input material is stopped when the first revolving member reaches a predetermined diameter by determining the number of revolutions the second revolving member will make when the first revolving member makes one revolution and then counting the revolutions of each until the first revolving member makes one revolution before the second revolving member makes the determined number of revolutions at which time the second revolving member will be stopped.

The invention has particular applicability to a strip processing line wherein strip material on a revolving coil is drawn from an uncoiler through the pinch rolls of a strip accumulator which stores a quantity of the strip while transferring strip to the processing line rendering it continuous. By determining the outer diameter of the coil at the point that the amount of strip remaining thereon will substantially fill the accumulator, determining the number of revolutions the pinch rolls will travel at the time the coil travels one revolution at the determined diameter and then generating signals proportional to both revolutions and counting the same, the feed to the accumulator may be stopped when a signal indicative of one revolution of the coil is received before the count of the signals from the pinch rolls has reached its determined revolutions. If such a signal is not so received, the count is started anew until such time that the coil signal is received before the determined number of pinch roll revolutions.

PREFERRED EMBODIMENT FOR CARRYING OUT THE INVENTION

Figure 1:
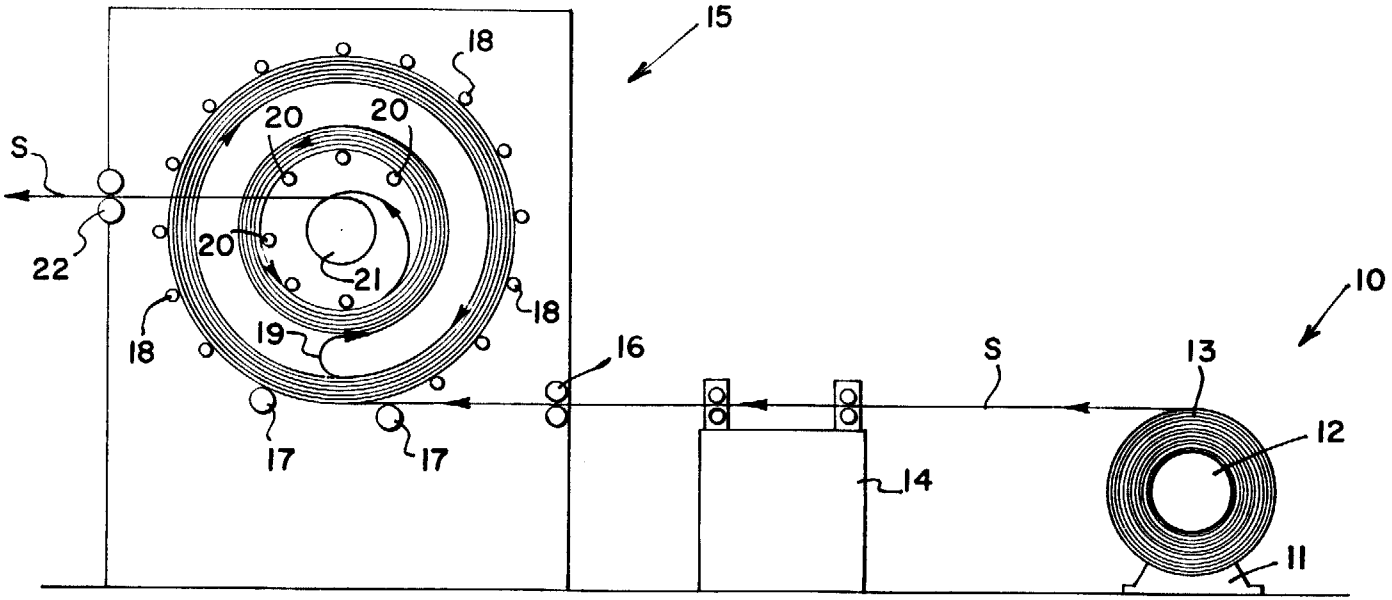
FIG. 1 is a schematic view of a strip accumulator, strip end joiner, and uncoiler which form a typical environment for the control of the subject invention.

A typical environment for the control system according to the concept of the present invention is shown schematically in FIG. 1. An uncoiler, indicated generally by the numeral 10, includes a base 11 and axle 12 upon which a coil 13 of strip material S revolves. Various types of uncoilers exist and the specific style utilized is unimportant to this invention. The strip S which may be of any material and gauge, can be fed through the jaws of an end joiner 14 to an accumulating device, indicated generally by the numeral 15. As will hereinafter be described in more detail, end joiner 14, which can be a welding device, is used to join the end of a coil of strip just depleted to a fresh coil placed on uncoiler 10. Alternately, rather than being permanently in line with the strip passing therethrough, end joiner 14 may be a portable device which is brought in line only when needed.

The accumulator 15 shown in generally of the type depicted in detail in U.S. Pat. Nos. 3,506,210 or 4,092,007, to which reference is made for whatever details might be necessary to fully understand the operation thereof; however, the invention described herein is capable of operating with any type of accumulating device, many of which are well known in the art. As schematically shown in FIG. 1, accumulator 15 includes pinch rolls 16, which when activated, pull the strip S from uncoiler 10 and into the accumulator. The strip is transferred past guide and support rolls 17, which may be driven with rolls 16 or could be driven instead of rolls 16, to form an outer coil of strip material retained by an outer basket defined by a plurality of outer basket rolls 18. The material travels around the outer basket rolls 18 and forms a free loop 19 as it is turned toward a series of rolls 20 which together form an inner basket to retain the inner coil of strip material. Upon demand from the processing line, which is almost always continual, the strip on the inside of the inner basket defined by rolls 20 is transferred around a take-out arbor 21 and guided by rolls 22 to the processing line. In order to fill the accumulator, strip must be fed thereto faster from uncoiler 10 than it is going out to the processing line. As this happens, the strip material builds up on the inside of the outer basket and outside of the inner basket of material because the free loop 19 orbits in a clockwise direction in FIG. 1 to deposit convolutions of material on each basket. During this buildup process, the outer rolls 18 move radially outward to allow for the storage of a quantity of strip therein.

The capacity of accumulator 15 can be expressed as the projected area of the two annuli of material which constitute the inner and outer baskets or coils. At the point in time that a new coil of strip material is being welded to the coil just being depleted, it is desirable that the accumulator be filled to capacity. The control circuit of FIG. 2 assures that such is the case. Basically the control circuit functions to stop the feed to the accumulator when an amount of strip equal to the capacity of the accumulator remains on the supply coil. Then the accumulator is substantially emptied to the processing line. At this point the remaining supply of the coil is fed to the accumulator. When only a few wraps of strip remain on the coil, the feed to the accumulator is slowed down so that the end of the strip can be aligned in the end joiner 14. After a new coil is welded to the old, emptying of the accumulator is continued and the accumulator is again filled and the entire process continues.

The manner in which the circuit of FIG. 2 accomplishes these functions will now be described in detail. The capacity of an accumulator, as defined above, is a known quantity with a typical quantity being 1500 square inches. It thus must be determined when the supply coil has that capacity remaining. Knowing the inside diameter of the supply coil, which is essentially the diameter of axle 12 of the uncoiler, it can be determined at what outside diameter of the supply coil the area of the annulus of strip left on the coil will equal the capacity of the accumulator. This outside diameter equals the square root of the insider diameter squared plus the quantity of four times the capacity divided by $\pi$. Assuming an inside coil diameter of twenty inches, for this example it can then be determined that when the outside diameter of the coil is approximately 48 inches, the capacity of the accumulator will remain on the input coil.

For reasons which will hereinafter become evident, the circuit of FIG. 2 needs information regarding the revolutions of both the uncoiler 10 and the pinch rolls 16. In particular it is important to know how many revolutions the pinch rolls will make when the uncoiler makes one revolution at the capacity diameter, in the example, 48 inches. For each revolution of the supply coil the pinch rolls will make a number of revolutions determined by the ratio of the supply coil outside diameter to the pinch roll diameter. If the pinch roll diameter were ten inches, for example, then the pinch rolls will make 4.8 revolutions when the supply coil makes one revolution at the 48 inch diameter.

Figure 2:
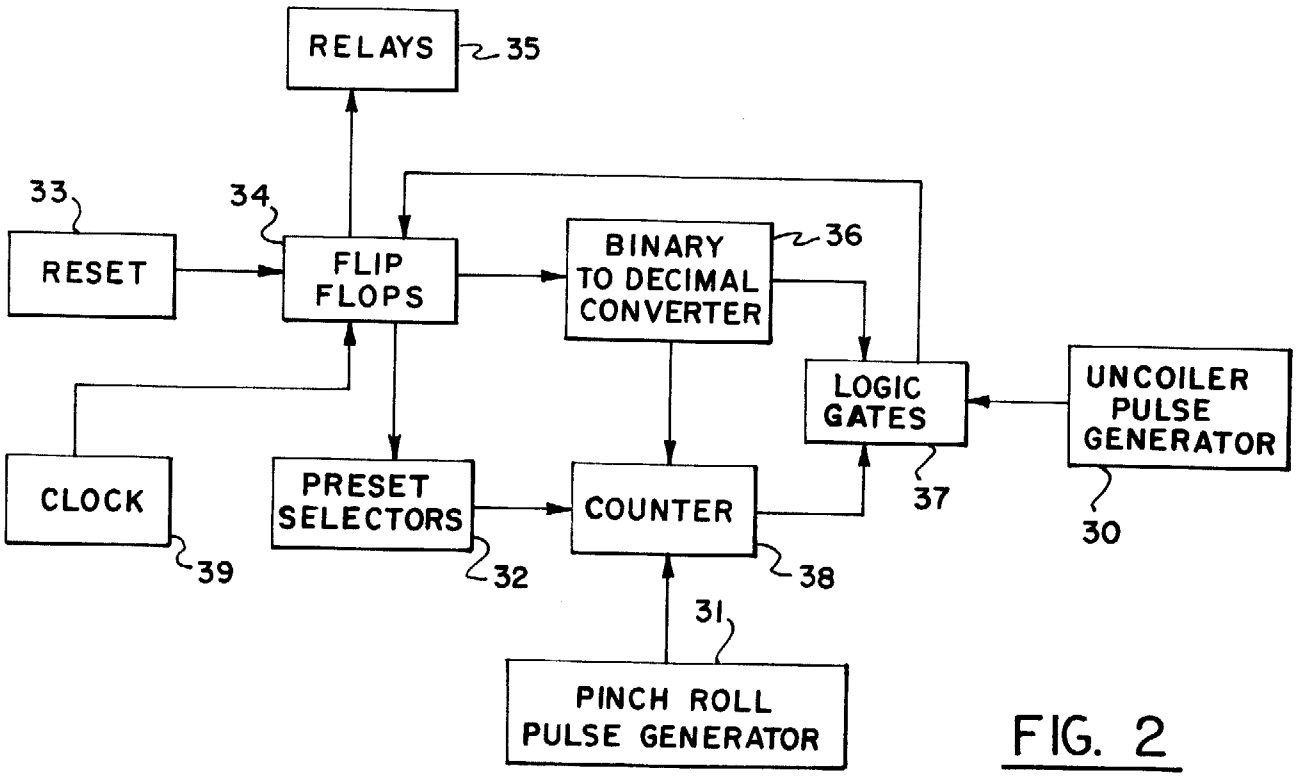
FIG. 2 is a block diagram of the electronic control according to the concept of the present invention.

The inputs to the circuit of FIG. 2 are from an uncoiler pulse generator 30 and a pinch roll pulse generator 31. These are conventional items which utilize a sensor, such as a photoelectric unit, to sense revolutions and provide pulses proportional thereto. Thus, the output of uncoiler pulse generator 30 is a signal, such as a series of pulses, the frequency of which is proportional to the revolutions of the supply coil. Preferably uncoiler pulse generator 30 can be set to produce a pulse once each revolution of the supply coil. Similarly, the output of pinch roll pulse generator 31 is a signal, such as series of pulses, the frequency of which is proportional to the revolutions of the pinch rolls. Preferably, for accuracy purposes pinch roll pulse generator 31 will provide a number of pulses per revolution of the pinch rolls, for example, one hundred. If such were the case then 480 pulses would occur when the pinch rolls made the 4.8 revolutions discussed hereinabove.

The number 480, which can be called the "last fill" number is then set into preset selectors 32 which have suitable bit capacity and which are conventional items known, at least by some manufacturers, as AND/OR selectors. Another number, representative of the number of pulses occuring from pinch roll generator 31 when the input coil makes one revolution at a diameter when only a few wraps of material remain on the coil, is also set into preset selectors 32. With the example given a typical number representative of the diameter of the coil when only a few wraps of material remain thereon would be 210, which can be called the "last wraps" number. It is usually sufficient to set the last wraps number at a diameter corresponding to the point when ten or less wraps remains.

With these predetermined numbers set into the selectors 32, the control system may be activated by the manual depression of a reset switch 33. This resets a plurality of flip flops 34 which in turn reset solid state relays 35 to permit the accumulator to be in a standard run mode. In addition, a signal from flip flops 34 places a conventional binary to decimal converter 36 at a first logic state. Upon demand from the accumulator, pinch rolls 16 begin to draw material off the coil. Upon the occurrence of a pulse from uncoiler pulse generator 30 indicative of the beginning of a revolution, a plurality of conventional AND/OR logic gates 37 change the state of flip flops 34 which places converter 36 at a second logic state and permits the number 480 to be loaded into a counter 38. Counter 38 can be of any conventional type, such as an up/down counter, and in this instance, it begins counting down from the last fill number, in the example 480, on the occurrence of each pulse from pinch roll pulse generator 31. As soon as the last fill number is loaded into the counter, the next pulse from clock 39 resets flip flops 34 which return converter 36 to its first logic state. If, and as long as, the diameter of the coil is greater than the last fill diameter, counter 38, [before reaching zero, will continue to be reset to the last fill number on each] *will reach zero and then be reset on the next* pulse from uncoiler pulse generator 30.

When the amount of strip remaining on the input coil is [equal to or] slightly less than the capacity of the accumulator, counter 38 will *not* get to zero before receiving a pulse from uncoiler pulse generator 30. At this point a signal from counter 38 through logic gates 37 changes the logic state of flip flops 34 and causes the binary to decimal converter 36 to go into a third logic state. The signal from flip flops 34 activates one of relays 35 to signal the accumulator 20 to stop filling and to empty to the processing line. The next pulse from clock 39 transfers converter 36 to a fourth logic state. As will hereinafter become evident, the fourth logic state enables counter 38 to count again. As emptying is initiated, the pinch rolls 16 will be decelerated and slack may occur in the strip between the uncoiler and the accumulator as the supply coil overruns from its own inertia. To prevent comparison between pinch roll revolutions and supply coil revolutions during this period from falsely indicating a smaller supply coil diameter, a time delay circuit (not shown) prevents converter 36 from entering a fifth logic state which, as will hereinafter be described slows down the accumulator.

When the accumulator has emptied an internal signal starts the pinch rolls again for the last fill. The same signal from flip flops 34 which activated relays 35 loads counter 38 with the last wraps number in preset selectors 32, that is, in the example 210. As before, counter 38, will count down and if, and as long as, the diameter of the coil is greater than the last wraps diameter[;], counter 38 [, before reaching zero,] *will reach zero and* will continue to be reset to the last wraps number on each pulse from uncoiler pulse generator 30. When the last wraps diameter is reached and counter 38 does not reach zero, a signal from counter 38 through logic gates 37 changes the logic state of flip flops 34 and causes the binary to decimal converter to go to a fifth logic state. The signal from flip flops 34 activates one of the relays 35 to signal the accumulator 20 to slow down so that the end of the strip, now under the manual control of an operator, can be properly positioned in the end joiner 14.

It should now be evident that by merely changing the preset selectors 32, to appropriate numbers whenever different gauge strip is used, the accumulator can be conveniently automatically operated, thus improving the accumulator control art.

We claim:

1. In combination, an uncoiler which carries a revolvable coil of strip material, an accumulator having revolving pinch rolls which draw strip material from the coil on said uncoiler, said accumulator at least temporarily storing a quantity of the strip material while transferring strip material to a processing line, and a control device, said control device comprising first means providing a signal proportional to the revolutions of said pinch rolls, second means providing a signal proportional to the revolutions of the coil, counter means having at least one predetermined number loaded therein and counting the occurrence of each signal from said first means, and means to reset said counter means to a said predetermined number if a signal from said second means is received by said means to reset [before] *after* said counter means has counted a number equal to said predetermined number.

2. The combination of claim 1 wherein the signal of said first means is a plurality of pulses per revolution of said pinch rolls and the signal of said second means is a single pulse per revolution of the coil, said predetermined number being the number of pulses which will be provided by said first means when the coil makes one revolution at a diameter at which the coil contains remaining strip material substantially equal to the capacity of the accumulator.

3. The combination of claims 1 or 2, said control device further comprising means to load said counter with said predetermined number.

4. The combination of claims 1 or 2, said control device further comprising means to load said counter means with more than one predetermined number, a second said predetermined number being the number of pulses which will be provided by said first means when the coil makes one revolution at a diameter at which the coil contains only a few wraps of strip material thereon.

5. The combination of claim 1, said control device further comprising means to load said counter means with more than one predetermined number.

6. The combination of claim 1, said control device further comprising relay means activated by said means to reset if a signal from said second means is [not] received by said means to reset before said counter means has counted a number equal to said predetermined number, said relay means controlling the operation of the accumulator.

7. The combination of claim 6 wherein said relay means includes a first relay to control the accumulator when the coil contains remaining strip material thereon substantially equal to the capacity of the accumulator and a second relay to control the accumulator when the coil contains only a few wraps of strip material thereon.

8. The combination of claim 1, said means to reset including means capable of exhibiting a plurality of logic states, one of said logic states resetting said counter means.

9. The combination of claim 8 wherein a second of said logic states enables said predetermined number to be loaded into said counter.

10. The combination of claims 8 or 9, said means to reset further including means to control the logic state of said means capable of exhibiting a plurality of logic states.

11. A method of controlling the automatic operation of a strip accumulator having revolving rolls which draw strip material from a revolving coil on an uncoiler to store the same for continuous use in a processing line comprising the steps of determining the diameter of the coil of material at the point that the remaining material on the coil will substantially equal the capacity of the accumulator, determining the number of revolutions said rolls travel at the time the coil travels one revolution at the determined diameter, drawing the strip material from the coil of material to the accumulator, monitoring the revolutions of the rolls and of the coil, and stopping the drawing of material from the coil when the coil travels one revolution before the rolls travel the determined number of revolutions.

12. A method according to claim 11 comprising the additional steps of after stopping the drawing of material, permitting the accumulator to substantially empty its strip material to the processing line, and restarting drawing strip material from the coil of material to substantially fill the accumulator to the capacity thereof.

13. A method according to claim 12 comprising the additional steps of determining the diameter of the coil of material at the point that only a few wraps of material remain on the coil, determining the number of revolutions the rolls travel at the time the coil travels one revolution at the point that only a few wraps of material remain thereon, and after the step of restarting drawing strip material slowing the drawing of material from the coil when the coil travels one revolution before the rolls travel the determined number of revolutions at the point that only a few wraps of material remain on the coil.

14. A method of controlling a processing line whose input is drawn from a first revolving member having a diminishing first diameter through a second revolving member having a constant diameter, the input to the processing line being stopped when the first revolving member reaches a predetermined diameter comprising the steps of determining from the predetermined diameter the number of revolutions said second revolving member will make when said first revolving member makes one revolution at the predetermined diameter, continually monitoring the revolutions of said first and second revolving members and stopping the input to the processing line when said first revolving member makes one revolution before the second revolving member makes the determined number of revolutions thereby controlling the processing line.

* * * * *